(No Model.) 2 Sheets—Sheet 1.

W. F. JOBBINS.
APPARATUS FOR MAKING CAUSTIC SODA.

No. 605,102. Patented June 7, 1898.

Witnesses
E. H. Powell
James M. Shipp

Inventor
William Frederick Jobbins.
By his Attorney
Frank L. Ayer (No Model.) 2 Sheets—Sheet 2.

W. F. JOBBINS.
APPARATUS FOR MAKING CAUSTIC SODA.

No. 605,102. Patented June 7, 1898.

Witnesses
E. H. Powell
James N. Shipps

Inventor
William Frederick Jobbins.
By his Attorney
Frank L. Ayer

UNITED STATES PATENT OFFICE.

WILLIAM FREDERICK JOBBINS, OF AURORA, ILLINOIS, ASSIGNOR OF ONE-HALF TO JOSEPH VAN RUYMBEKE, OF SAME PLACE.

APPARATUS FOR MAKING CAUSTIC SODA.

SPECIFICATION forming part of Letters Patent No. 605,102, dated June 7, 1898.

Application filed October 6, 1897. Serial No. 654,247. (No model.)

*To all whom it may concern:*

Be it known that I, WILLIAM FREDERICK JOBBINS, a citizen of the United States, residing at Aurora, county of Kane, State of Illinois, have invented new and useful Improvements in Plants for the Manufacture of Caustic-Soda Lye and for the Drying of the Residue Therefrom, of which the following is a specification.

In order that the invention may be better understood, attention is directed to the accompanying drawings, in which—

Figure 1:
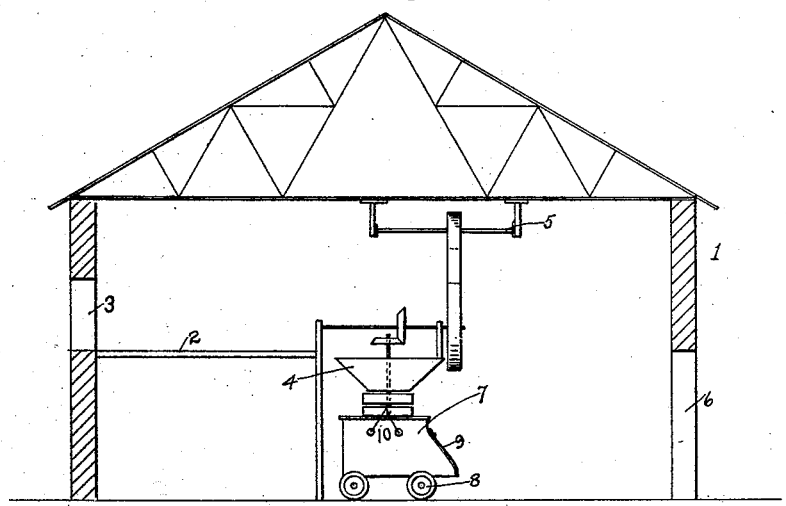
Figure 4:
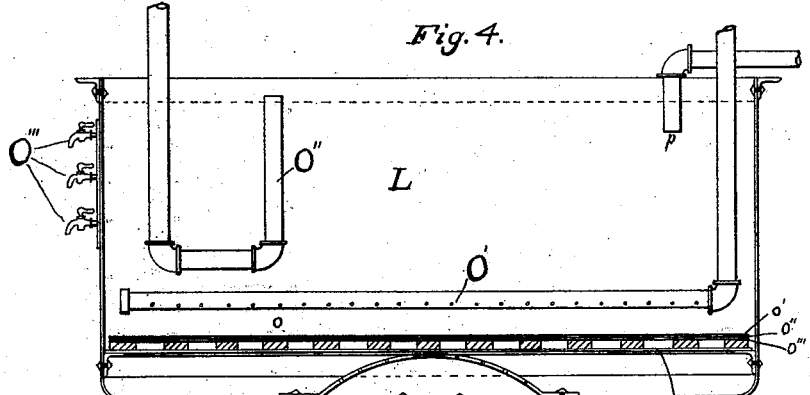
Figure 5:
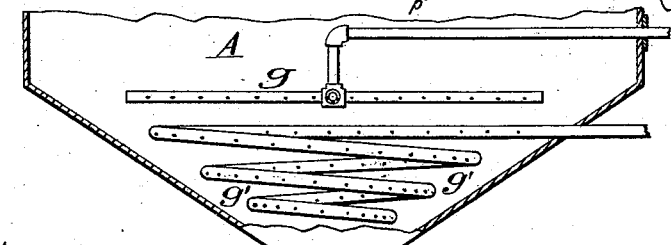
Figure 2:
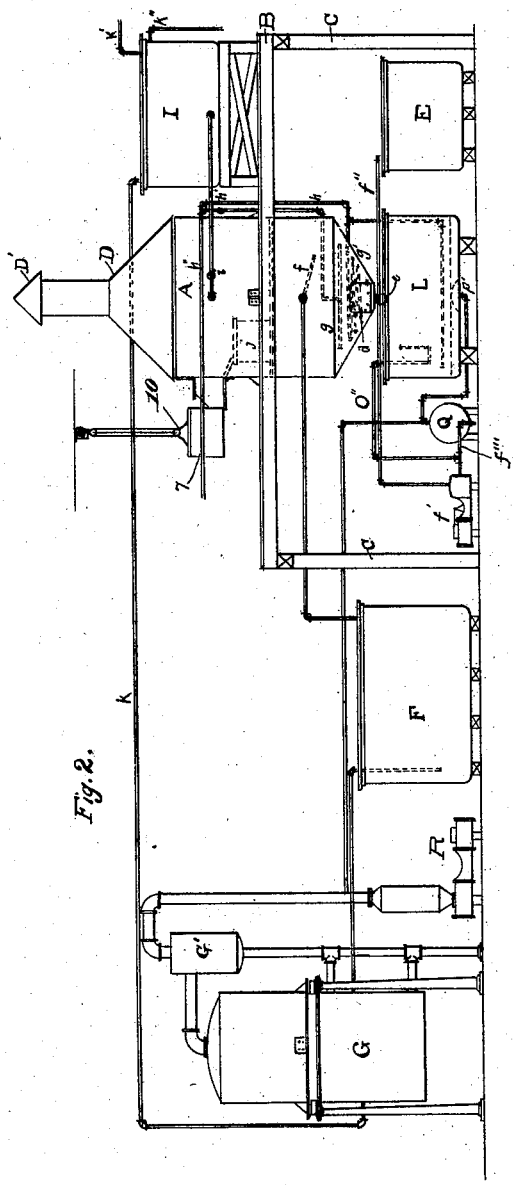
Figure 3:
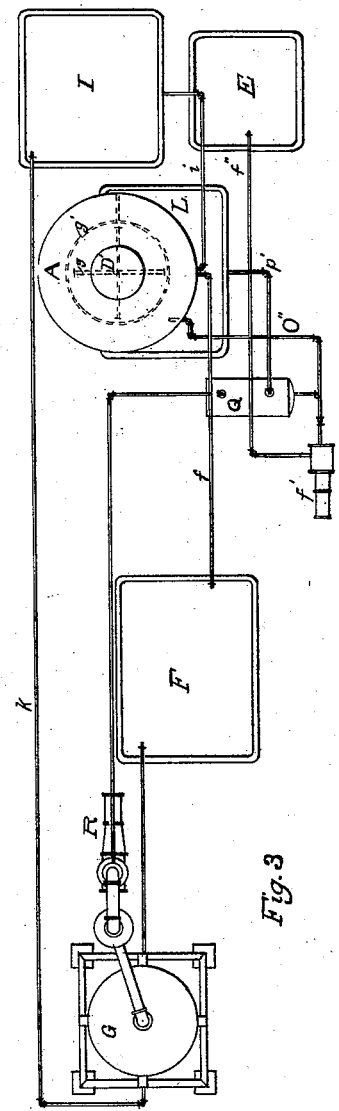

Figure 1 is a section of the conventional form of lime-house. Fig. 2 is a side view of the converting-kettle, screen-tank, lye-storage tank, evaporator, pumps, &c. Fig. 3 is a top plan view thereof. Fig. 4 is an enlarged sectional view of the screen-tank, showing screen therein; and Fig. 5, an enlarged sectional view of the lower portion of the converting-kettle.

It is best to provide a building or a suitable fireproof room or inclosure for the storage and preparation of the lime to be used in the converting-kettles, and as imperfectly burnt or inferior qualities of lime often contain stone or unburnt material such is preferably crushed before being passed to the converting-kettle, as it also affords an easier, more rapid, and complete operation in the converting-kettle.

In the figures, 1 represents the lime-house, having a raised or elevated iron floor 2 for the storage of the lime. Adjacent to one side of this elevated floor is a door 3, through which the lime can be received.

4 is a lime mill or crusher operated by a suitable power, a counter-shaft 5 being shown. The crushed lime from the mill may be passed directly into the carrier 7, which may be of perforated iron if it is to be used as a basket inside of the converting-kettles, or the carrier may be provided with double-flap doors 9 when it is to be used as a chute.

8 is a wheeled frame for carrying the basket or chute to the converting-kettle. In lieu of this wheeled frame an overhead tramway may be used, as is shown in Fig. 2.

The carrier 7 is provided with suitable swivel-handles 10, by means of which the carrier can be hoisted and its contents emptied.

6 is the entrance from the lime-house to the converting-kettle.

The lime-carrier 7 is preferably made of iron or a non-inflammable material, and as the floor in front of the iron converting-kettle is bricked or covered with iron or otherwise made fireproof no danger is incurred by using this carrier in an ordinary building, thus enabling this part of the operation to be carried on in an ordinary factory building.

By the use of power the lime can be conveyed to the converting-kettle by means of any suitable endless conveyer or to any conveniently located receiver, from which it can be either by hand or automatically fed into said converting-kettles.

Attention being directed to Figs. 2 and 3, A is a converting-kettle formed of any suitable shape and with a conical, beveled, or flat bottom, as may be desired. This kettle is supported by means of lugs from the I-beam frames B.

C are suitable iron pillars for supporting the beams B.

The top of the kettle is preferably covered with a hood D, formed of wood or metal, at the top of which is an exit D' for the passage of the steam from the kettle. Near the bottom of the converting-kettle I have shown an iron door $d$ for the removal of the residuum. This door when used is preferably shaped to conform to the kettle and is carried down as nearly to the bottom of the kettle as is possible. At the extreme bottom of the kettle is a valved outlet-pipe $e$, also for the removal of the residue.

$f$ is a pipe having a pivoted elbow within the kettle, by means of which the liquid lye can be run into the receiving-tank F.

Located at the bottom of the kettle A is preferably a perforated coil of steam-pipe $g$, through which steam can be ejected for the boiling of the caustic lye, and it can also be used for producing motion of the contents of the kettle. In addition to this a closed coil of steam-pipe $g'$ may be employed for heating the contents of the converting-kettle. If the perforations in the steam-pipe $g$ are placed underneath the pipe and on the sides thereof at about an angle of forty-five degrees, there will be a thorough agitation of the material, obtaining a complete conversion. The pipes $g$ and $g'$ are located at any suitable distance above the bottom of the kettle.

Air under pressure may be injected into the liquid, or to attain the same end a mechanical mixer or stirrer can be introduced within the kettle, the object being to maintain a constant agitation of the contents of the kettle and the complete admixture thereof. The pipes $g$ and $g'$ are connected with a source of steam-supply by means of the pipe $h$, having the valve $h'$ therein. $h''$ is the main steam-pipe, shown running across the front of the kettle. If more than one kettle is used, this pipe can be extended for the supply of steam to the additional kettles.

Below the hood D is an opening, preferably in front, for the introduction of the ash and lime. The latter is preferably introduced in small quantities at a time into the basket $j$, which is adjacent to said opening, so located as to be partially immersed within the liquid. The entrance to the kettle is protected by a door, which being closed when not in use will prevent the outlet of the steam. As shown, the hood D should extend a short distance beyond the sides and over the top of the kettle, so that the draft thereby produced will facilitate the exit of the steam through the opening D'. The hot-water-receiving tank I is elevated, so that its contents can be run into the converting-kettle A by means of the valved pipe $i$. This tank is supplied with hot water from the coils of the evaporator or concentrator G by means of the pipe $k$. If this supply is insufficient, additional water, either hot or cold, may be introduced by means of the valved pipe $k'$.

$k''$ is an overflow from the tank I.

Situated below the converting-kettle is the screen-tank L, into which the residue of the materials used can be emptied by means of the pipe $e$ or the door $d$. This tank is preferably provided with a false suspended bottom $o$, (see Fig. 4,) consisting of one or more layers of canvas and wire-gauze and which is so arranged that the residue or lime mud will not pass through the screen when operated upon by a vacuum-pump, the liquid and air passing through a pipe connecting with the bottom of the tank. This false bottom is preferably placed two or three inches above the bottom of the tank and consists, first, of a wire screen $o'$ of very fine mesh, underneath which the duck or canvas $o''$ is stretched. The fabric is supported, preferably, upon a sheet of gauze $o'''$ of slightly-coarser mesh, which in turn is supported upon an iron frame $o''''$. Within this tank, a short distance above the false bottom, is a perforated steam-pipe O', the perforations of the pipe being preferably arranged underneath and on the sides thereof at an angle of about forty-five degrees. A suitable jointed elbow O'' is used for decanting such portion of the supernatant liquid and wash-water as settles above the residue. O''' are faucets or cocks used for accomplishing the same purpose. A pipe $p$ for the supply of water for the admixture and the washing from the lime mud or residue of any caustic lye not removed in the kettle is placed at one side of the tank. Adjacent to the screen-tank L is the wash-water tank E, which is connected to said tank by means of the pipe O'', through which the wash-waters from said screen-tank can be transferred to said wash-water tank.

R is the vacuum-pump, having a connection at $p'$ with the bottom of the screen-tank and discharging into the catchall or tank Q, from which the wash-water can be transferred to the wash-water tank E by means of the service-pump $f$ and pipes $f''$ $f'''$.

The operation of the plant is as follows: Water is run into the converting-kettle A and brought to a boil therein, and then a given quantity of soda-ash is put into the said converting-kettle and the boiling continued till the complete dissolution of the ash, making a solution of about 12° Baumé. Then small portions of lime are added gradually through the medium of the lime-basket $j$, placed at a point in the converting-kettle so that such basket will be suspended partly in the liquid. The boiling (with open steam) is continued and lime added for the conversion of the soda-ash into caustic soda, which can be determined by testing in any suitable way. When the liquid is thoroughly causticized, as indicated by the suitable test referred to, the steam is shut off and the whole allowed to settle for a time, after which the clear liquid is then drawn off from the converting-kettle by means of the pipe and elbow $f$, either by gravity or being pumped and run to a suitable tank or other receptacle F for storing the liquor, from whence it is delivered direct to the soap-factory, or if not of sufficient density it is then run to the evaporator G, which can be of any suitable construction for concentrating it to the desired density. The eduction-pipe from this evaporator connects, preferably, with a catchall G', by means of which moisture mechanically entrained with the vapors may be arrested and conveyed back to the evaporator. There will then remain in the converting-kettle A mud composed of calcium carbonate entangled with caustic-soda lye, which mud is drawn from the converting-kettle through either or both of the outlets $e$ or $d$ in the bottom of said kettle and run into the screen-tank L and allowed to settle, and the liquor above the lime mud or residue is drawn off through a suitable pipe O'' siphonically or by means of a pump, or can be run off by gravity through an outlet or outlets O''' on the side of said screen-tank, and is run to the same tank F as the clear liquid that was previously drawn off from the converting-kettle, or if of insufficient strength it may be run to the tank or receptacle E. Then water is run into the screen-tank and the mass brought to a boil by the injection of steam through the perforated steam pipe or coil, after which the mass is again allowed to settle, and the resulting clear liquid that then settles above the lime mud is decanted or drawn off in the same manner. Then more water is added to the mud in the screen-tank and the same operation repeated until the clear liquid that settles in said tank shows "0" Baumé when tested with a regular alkali hydrometer. Then the remaining liquid with which the mud is saturated is drawn therefrom by means of applying a vacuum below the screen, the liquor being drawn by said vacuum into a suitable receiver, preferably a cylindrical vessel Q, and the liquor thus collected in the cylindrical vessel is then run to join the other wash-waters that have been drawn from the screen-tanks by other means. Such of these wash-waters as have been run from the screen-tank L to a receptacle E separate from the storage-tank, from which the soap-house or evaporator is supplied, are used in the converting-kettle for dissolving the next charge of soda-ash, such water being added in addition thereto as may be required, which additional water is preferably a water of condensation from the steam-coils or heating-chamber of the evaporator, which water of condensation shall have been run to the tank I or other suitable receptacle.

Having now described my invention, what I claim, and desire to secure by Letters Patent, is—

1. In an apparatus for making caustic lye, the combination with a converting or causticizing kettle, a perforated pipe or pipes located within said kettle, a basket within said kettle for removing the lime, and a chute for directing the lime into said basket, of a screen-tank located adjacent to said kettle for receiving the sludge therefrom, substantially as set forth.

2. In an apparatus for making caustic lye, the combination with a converting or causticizing kettle, a perforated pipe or pipes located within said kettle, and a swinging pipe in said kettle for decanting the liquid therefrom, of a screen-tank located adjacent to said kettle for receiving the sludge therefrom, substantially as set forth.

3. In an apparatus for making caustic-soda lye, the combination with a converting or causticizing kettle having heating and agitating devices therein of the screen-tank adjacent thereto provided with a false bottom therein and an exhaust-pump connected with said screen-tank below said false bottom substantially as described.

4. In an apparatus for making caustic-soda lye, the combination with a converting or causticizing kettle having heating and agitating devices therein of the screen-tank adjacent thereto provided with a false bottom therein and an exhaust-pump connecting with said screen-tank below said false bottom and a wash-water tank connected with said screen-tank substantially as described.

5. In an apparatus for making caustic-soda lye, the combination with a converting or causticizing kettle having heating and agitating devices therein of the screen-tank adjacent thereto provided with a false bottom therein and the exhaust-pump connecting below said false bottom and a wash-water tank adjacent to said screen-tank and having connections thereto, and the concentrators or condensers connecting with said screen-tank substantially as described.

This specification signed and witnessed this 1st day of September, 1897.

WILLIAM FREDERICK JOBBINS.

Witnesses:
FRANK L. DYER,
ARCHIE G. REESE.